United States Patent [19]

Aycock et al.

[11] Patent Number: 4,824,887

[45] Date of Patent: Apr. 25, 1989

[54] HIGH IMPACT RUBBER MODIFIED POLYSTYRENE AND POLYPHENYLENE ETHER RESINS CONTAINING THE SAME

[75] Inventors: David F. Aycock, Glenmont, N.Y.; Peter H. Shu, Pittsburgh, Pa.

[73] Assignee: General Electric Company, Selkirk, N.Y.

[21] Appl. No.: 944,696

[22] Filed: Dec. 19, 1986

[51] Int. Cl.$^4$ .................. C08K 5/51; C08L 69/00; C08L 71/04

[52] U.S. Cl. ................... 524/151; 525/67; 525/68; 525/92; 525/151; 525/152

[58] Field of Search ............ 525/68, 905, 67, 151, 525/152; 524/151

[56] References Cited

U.S. PATENT DOCUMENTS

| | | | |
|---|---|---|---|
| 4,128,602 | 12/1978 | Katchman et al. | 525/68 |
| 4,128,603 | 12/1978 | Katchman et al. | 525/68 |
| 4,128,604 | 12/1978 | Katchman et al. | 525/68 |
| 4,448,931 | 5/1984 | Sugio et al. | 525/68 |
| 4,513,120 | 4/1985 | Bennett, Jr. et al. | 525/68 |

*Primary Examiner*—Jacob Ziegler
*Attorney, Agent, or Firm*—Hedman, Gibson, Costigan & Hoare

[57] ABSTRACT

Disclosed are thermoplastic compositions of improved mold flow comprising a polyphenylene ether resin and novel rubber modified polystyrenes containing dispersed rubbery particles having a maximum mean diameter of about 2.0 microns and a ratio of the volume average particle size/number average particle size of from not substantially less than 2.00 up to 3.20. Articles molded from the composition have vastly improved surface gloss and ductile impact strength in comparison with conventional polyphenylene/high impact rubber modified polystyrene compositions.

21 Claims, No Drawings

HIGH IMPACT RUBBER MODIFIED POLYSTYRENE AND POLYPHENYLENE ETHER RESINS CONTAINING THE SAME

FIELD OF THE INVENTION

The present invention relates to novel high impact rubber modified polystyrenes and to polyphenylene ether resins containing the same which have superior gloss, flow properties and impact strength compared to polyphenylene ether resins containing known rubber modified high impact polystyrenes. As a result of the present invention, polyphenylene ether resins provide superior extrusion and injection molded articles which are lightweight, highly impact resistant and have a high quality appearance.

BACKGROUND OF THE INVENTION

Polyphenylene ether resins are high performance naturally flame retardant engineering thermoplastics having relatively high melt viscosities and softening points (i.e., in excess of 200° C.). They are useful for many commercial applications requiring high temperature resistance and can be formed into films, fibers and molded articles. However, the art has recognized that polyphenylene ethers have a major drawback which is that they can not be easily melt processed and foam molded, particularly to very low densitites.

Polyphenylene ethers have been combined with polystyrene resins to improve moldability. For example, Cizek, U.S. Pat. No. 3,383,435, discloses that improved processability of polyphenylene ether can be obtained by addition of polystyrene and copolymers containing polystyrene includng rubber-modified high impact polystyrene.

More recently, Katchman et al., U.S. Pat. No. 4,128,602 disclosed using a polystyrene resin and rubber having a dispersed particulate rubber phase wherein the dispersed particles have a maximum mean diameter of about 2 microns to provide a polyphenylene ether resin having improved impact strength. Sugio et al., U.S. Pat. No. 4,448,931, disclosed a polyphenylene ether resin composition having improved impact resistance containing a rubber-modified polystyrene, wherein at least 80% of the rubber particles based on the total number of rubber particles in the elastomeric phase of the rubber-modified polystyrene resin have a particle diameter in the range of 0.5 to 4 microns and the elastomeric phase has a particle size distribution index (SDI) of no more than 1.9. Bennett and Lee, Jr., U.S. Pat. No. 4,513,120, disclosed a polyphenylene ether resin composition having improved impact strength and surface appearance containing a rubber-modified polystyrene, wherein a substantial majority of the rubber particles are of the core/shell type having a polystyrene core and a rubber membrane, and the particles are dispersed in a styrene matrix, the particle diameter being no greater than about 2 microns (average) and the particle size distribution (Sv/Sn) being above 3.20, e.g., 3.25.

Although the aforementioned compositions are stated to have improved impact strength, there is no disclosure in Sugio et al. of improvement in the gloss and no disclosure in either of the effect on flow properties of the polyphenylene ether compositions.

Applicants have now discovered a novel high impact polystyrene defined by the maximum mean diameter of the rubber particles and their particle size distribution which when used, either alone, or when combined with polyphenylene ether resins provides molded articles with high gloss, improved flow properties and vastly improved impact strength over known compositions.

It is therefore an object of the present invention to provide a novel rubber modified high impact polystyrene.

It is a further object of the invention to provide a polyphenylene ether resin/rubber modified high impact polystyrene composition having improved gloss, flow properties and impact strength.

It is a still further object of the invention to provide molded articles from the polyphenylene ether resin/rubber modified high impact polystyrene composition which are lightweight and have improved properties over molded articles made from known modified polyphenylene ether resins.

SUMMARY OF THE INVENTION

According to the present invention, there is provided a novel rubber modified high impact polystyrene comprising a rubber modified polystyrene containing dispersed rubbery particles having a maximum means diameter of about 2.0 microns and a ratio of the volume average particle size/number average particle size of from not substantially less than 2.0 to about 3.20, preferably between about 2.75 and 3.0. The present invention is also directed to polyphenylene ether resin compositions containing the above-described high impact polystyrene and to articles molded from such compositions which are lightweight, highly impact resistant and have high gloss.

In preferred features, the polyphenylene ether resin will comprise poly(2,6-dimethyl-1,4-phenylene ether) and copolymers and the polystyrene component will be modified with polybutadiene.

DETAILED DESCRIPTION OF THE INVENTION

The polyphenylene ethers (also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a clsss by the presence of arylenoxy structural units. The present invention includes all such variations and modifications, including but not limited to those described hereinafter.

The polyphenylene ethers favored for use in the practice of this invention generally contain structural units of the following formula

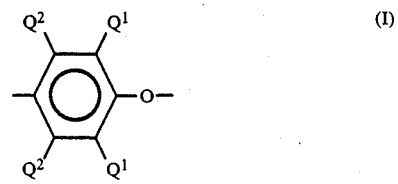

in which in each of these units independently each $Q^1$ is hydrogen, halogen, primary or secondary lower alkyl (i.e., alkyl containing up to 7 carbon atoms), phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, secbutyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included. Suitable homopolymers are those containing, for example, 2,6-dimethyl-1,4-phenylene ether units. Suitable copolymers include random copolymers containing such units in combination with, for example, 2,3,6-trimethyl1,4-phenylene ether units. Many suitable random copolymers, as well as homopolymers, are disclosed in the patent literature, including various Hay patents. Also contemplated are graft copolymers, including those prepared by grafting onto the polyphenylene ether chain such vinyl monomers as acrylonitrile and vinyl aromatic compounds (for example, styrene), and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenelyene ether generally has a molecular weight (number average, as determined by gel permeation chromatography, whenever used herein) within the range of about 5,000 to 40,000. The intrinsic viscosity of the polymer is usually in the range of about 0.4 to 0.6 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in water for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials.

Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, -hydroxyoximes (both monomeric and polymeric), o-hydroxyaryl oximes, and -diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

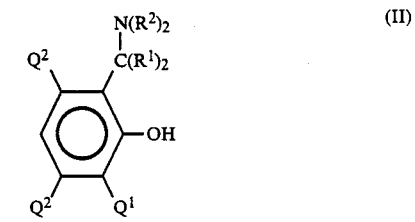

(II)

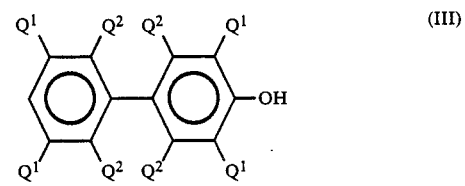

(III)

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the -hydrogen atoms on one or more $Q^1$ radicals adjacent to the hydroxy group on the terminal unit of the polymer chain. During further processing and/or blending, the aminoalkylsubstituted end groups may undergo various reactions, probably involving a quinone methide-type intermediate of formula IV, below ($R^1$ is defined as above), with beneficial effects often including an increase in impact strength and compatibilization with other blend components.

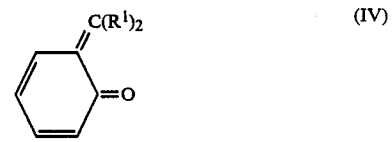

(IV)

Polymers with biphenol end groups of formula III are typically obtained from reaction mixtures in which a by-product diphenoquinone of formula V, below, is present, especially in a copper-halide-secondary or tertiary amine system. In this regard, the disclosures of the U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

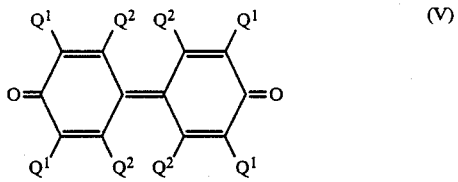

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups.

It will thus be apparent to those skilled in the art that a wide range of polymeric materials encompassing the full recognized class of polyphenylene ether resins are contemplated as suitable for use in the practice of the present invention.

The rubber modified polystyrenes which are used in the present invention are made by a process which comprises thermal polymerizing the styrene monomer for a time sufficient to achieve a degree of conversion of at least above about 85%, preferably at least 90% and up to 92%, to thereby insure crosslinking of the rubber components. Such a process is disclosed in copending U.S. patent application, Ser. No. 807,832, filed Dec. 11, 1985, now abandoned.

The rubber particles dispersed in the polystyrene have a particle size distribution within defined limits such that the dispersed rubbery particles have a maximum mean diameter of about 2.0 microns and a ratio of the volume average particle size/number average particle size of from not substantially less than 2.0 up to about 3.20, preferably from about 2.75 to 3.0.

The process may be carried out on a continuous basis by feeding a solution of styrene and the rubber under prescribed agitation conditions to a standard reactor and polymerizing the mixture to obtain the desired composition having rubber particle sizes in accordance with the invention.

The styrene monomer used in the reaction may be styrene itself, or any of the homologs or analogs suitable for use in styrene polymerization, and particularly compounds of the formula

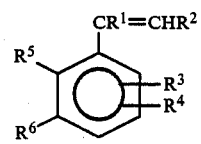

wherein $R^1$ and $R^2$ are selected from the group consisting of lower alkyl or alkenyl groups of from 1 to 6 carbon atoms, and hydrogen; and $R^3$, $R^4$. $R^5$, $R^6$ are selected from the group consisting of chloro, bromo, hydrogen and lower alkyl or alkenyl groups of from 1 to 6 carbon atoms. Examples include alpha-methyl styrene, para-methyl styrene, 2,4-dimethyl styrene, chlorostyrene, dichlorostyrene, bromostyrene, dibromostyrene, para-tertbutyl styrene, and para-ethyl styrene.

If desired, styrene copolymers can be formed, such as styrene-acrylonitrile copolymer, from the corresponding comonomers.

Any of the rubbers known to be useful in the formation of rubber modified, high impact polystyrene can be used in the present process, including polybutadiene, polyisoprene, ethylene-propylene copolymers (EPR), ethylene-propylene-diene (EPDM) rubber, styrene-butadiene copolyers (SBR), polyacrylpolyacrylates, and so forth.

Conventional amounts of rubber can be used, for example, from about 4 to about 30 percent by weight, based on 100 percent of the HIPS (that is, the polystyrene resin and rubber content combined).

The styrene monomer feed can optionally also contain other ingredients to facilitate the reaction or to prevent undesired side effects. Thus, for instance, a small amount of mineral oil or other lubricant which acts as a processing aid can be included, as well as small amounts of antioxidants or stabilizers to retard or reduce thermal degradation of the polystyrene or the rubber during the isolation step or in subsequent processing.

Residence times and reaction temperatures are empolyed which effect conversion of 90 percent or more, ultimately, of the styrene monomer feed to the reactor train. Such conditions will obviously vary with the system design, the feed composition, and, if used, the catalyst concentration. For instance, when styrene is thermally polymerized the degree of conversion can be increased in the polymerization reaction system by increasing the temperature profile of the reactor train. In addition, if a polymerization catalyst is used, such as a peroxide, the degree of conversion can be increased by increasing the catalyst concentration.

In a preferred process of HIPS product stream from the last reactor in the train can be mixed with a second stream, which comprises a solution of a polyphenylene ether resin in a solvent in which at least the polystyrene phase of the HIPS is also soluble, to effect solution blending.

Any organic solvent for the polyphenylene ether resin and rubber modified, high impact polystyrene resin (HIPS) may be used, including but not limited to benzene; toluene; ethylbenzene; cumene; xylene; methylethylbenzene; aliphatic hydrocarbons, for example, methylene chloride; aromatic halohydrocarbons, for example, chlorobenzene and dichlorobenzene; aryl alkyl ethers, for example, anisole, p-methylanisole, and ethyl phenyl ether; and aromatic carboxylic acid esters, for example, methyl benzoate.

Although blends of the polyphenylene ether/polystyrene can vary from about 1 to 99 to 99 to 1 parts by weight, preferred compositions comprise from 10 to 90 parts by weight, most preferably 20 to 80 parts by weight of the polyphenylene ether resin and from 90 to 10, most preferably 80 to 20 parts by weight of the polystyrene component, based on the total weight of the composition.

In preferred embodiments of the invention, the volume average particle size of the rubber particles is up to 2.0. Additionally, the rubber modified polystyrene preferably has a ratio of the weight average molecular weight (Mw)/number average molecular weight (Mn) of at least 2.5. Still further, the thermoplastic composition of the invention preferably has a swell index of up to about 11.0 and a gel concentration of at least about 19%.

By way of a preferred embodiment of the invention, the thermoplastic composition desirably has a number average molecular weight of about 61,000, a weight average molecular weight of about 195,000, a number average rubber particle size of about 0.60, a volume average rubber particle size of about 1.60, a swell index of about 9.9 and a gel concentration of about 21.3%.

The present compositions can also be formulated to include other ingredients besides the polystyrene alone or combined with the polyphenylene ether. These may be selected from among conventional materials commonly employed in polystyrene resins or polyphenylene ether resin blends. Examples are flame retardant agents, plasticizers, mold release agents, melt viscosity reducers, colorants, stabilizers, antioxidants, mineral fillers (for example, clay), glass reinforcements, titanium oxides, lubricants, fragrances and so forth, Conventional amounts varying, for example, from less than 1 to greater than 50 percent by weight, per 100 percent by weight of the total composition, may be utilized. The compositions can be prepared in conventional ways, e.g., by melt blending the ingredients in an extruder, or on a mill, or by mixing solutions of the resins and additives and devolatilizing, or in any other desired manner.

The compositions can also be modified to include impact strength improving amounts of polymeric impact improvers, such as rubbery styrenic block copolymers, for example, di- or triblock copolymers of styrene and butaidene or the hydrogenated derivatives, i.e., styrene and ethylene/butylene, as well as core-shell polymers, e.g., polyacrylate, core/styrene shell interpolymers.

Flame retardant additives for such compositions are also well known. For example, aryl phosphates, such as triphenyl phosphate can be used, halogenated organics, such as decabromodiphenyl ether, brominated polystyrene, and brominated polycarbonates, alone, or with an antimony oxide or similar synergists can be used.

Generally, the shaped articles, including structural foams, of the present invention may be prepared by any of the known methods in the art. For example, the articles may be prepared by melt or solvent blending, extruding and chopping or by dry mixing the foaming agents and polymer composition, and thereafter melt blending the composition in an extruder. The compositions may be injection molded, extruded and the like to produce finished articles to stock materials.

DESCRIPTION OF THE PREFERRED EMBODIMENTS

The following examples illustrate the present invention. They are not to be construed to limit the claims in any manner whatsoever. The following American Society of Testing Materials (ASTM) tests were used for property measurements: Heat Distortion Temperature, ASTM-D648; Izod Impact Strength, ASTM-D256; Tensile/Elongation, ASTM-D638; Flammability was measured according to Underwriters' Laboratories Bulletin 94; 45° Gloss by ASTM-D2457; and Ductile Impact Strength by ASTM-D3763, the Dynatup Method. Melt Viscosity was determined by using an Instron capillary rheometer and Channel Flow was determined by measuring distance traveled during injection molding in a spiral mold.

EXAMPLE 1

A novel rubber modified high impact polystyrene in accordance with the invention is prepared by feeding the composition shown in Table 1 to a polymerization reactor train consisting of four stirred plug flow reactors equipped with ten separate temperature control zones as shown in Table 2. The feed rate to the reactor train is 378 grams per minute. The first three reactors contain three temperature control zones, each zone with a 24.7 volume. The last reactor contained only 124.7 liter zone.

TABLE 1

| Materials | Amount, % by weight |
|---|---|
| Styrene | 75.7 |
| Toluene | 13.7 |
| Polybutadiene rubber (Taktene 1202, Polysar Co.) | 7.8 |
| Mineral Oil | 1.7 |
| Octadecyl 3-(3'5'-di-tert-butyl-4'-hydroxy-phenol) propionate (Irganox 1076, Ciba-Geigy Corp.) | 0.1 |

TABLE 2

| Zone No. | Temperature, °C. |
|---|---|
| 1 | 120 |
| 2 | 128 |
| 3 | 132 |
| 4 | 138 |
| 5 | 145 |
| 6 | 152 |
| 7 | 165 |
| 8 | 180 |
| 9 | 180 |
| 10 | 180 |

The product from the last reactor has a measured conversion of 42%. It is devolatilized and collected as a rubber modified, high impact polystyrene (Example 1). The rubber content, rubber particle size parameters and molecular weight properties of the composition are set forth in Table 3. For comparison purposes, data is shown in Table 3 for a sample of a known rubber modified high impact polystyrene AH 1897 (comparative example) sold by Huntsman Chemical Corp.

TABLE 3

|  | Example 1 | Comparative Example A* |
|---|---|---|
| Rubber content (%) | 9.4 | 10.5 |
| *Rubber number average particle size (Sn) | 0.57 | 0.62 |
| *Rubber volume average particle size (Sv) | 1.63 | 2.25 |
| *Rubber particle size distribution (Sv/Sn) | 2.86 | 3.63 |
| Composition number average molecular weight (Mn) | 61,000 | 73,000 |
| weight average molecular weight (Mw) | 195,000 | 245,000 |
| Molecular weight Distribution (Mw/Mn) | 2.86 | 2.25 |
| Swell Index | 9.9 | 18.0 |
| Gel Content (%) | 21.3 | 17.7 |

*Rubber particle size is measured with a Horiba CAPA-500 particle size Analyzer.

As shown in Table 3, the high impact polystyrene prepared for use in this invention has a smaller rubber particle size than the comparative HIPS product and a lower molecular weight and swell index and a higher gel content.

EXAMPLE 2

A flame retardant composition comprising poly(2,6-dimethyl-1,4-phenylene ether) and the high impact strength rubber modified polystyrene prepared by the above-mentioned Example 1 is prepared by extrusion blending at 540° F., and molded at 520° F. (cylinder) and 150° F. (mold). The physical properties, surface appearance and flammability are measured by standard test methods. For comparison purposes, an identical composition, except for substituting an equal weight of the above-mentioned polystyrene of the prior art, denoted AH-1897, above, was prepared, molded and tested. The formulations used and the results obtained are set forth in Table 4:

TABLE 4

Compositions Comprising Polyphenylene Ether and High Impact Polystyrene

| Example | 2A* | 2 |
|---|---|---|
| Composition (parts by weight) | | |
| Poly(2,6-dimethyl-1,4-phenylene ether | 50 | 50 |
| Rubber modified Polystyrene (Example 1) | — | 50 |
| Rubber particle size distribution, Sv/Sn, 2.86 | | |
| Rubber modified Polystyrene (AH-1897) | 50 | — |
| Rubber particle Flammability distribution, Sv/Sn, 3.63 | | |
| Phosphate Flame Retardant | 14.5 | 14.5 |
| Additives for mold release, stabilization, etc. | 2.3 | 2.3 |
| Properties | | |
| (a) Heat distortion Temp, °C. @ 266 psi | 183 | 181 |
| (b) Flow Channel, inches | 16.8 | 17.5 |
| (c) Izod impact strength, ft-lbs/in. notch | 3.9 | 4.6 |
| (d) Dynatup Impact, EMax, in-lb | 27 | 230 |
| (e) Tensile yield strength, psi | 6133 | 6545 |
| (f) Tensile ultimate strength, psi | 5761 | 5901 |
| (g) Tensile elongation, % | 51 | 51 |
| (h) Flexural modulus, psi | 332,975 | 326,048 |
| (i) Flexural yield, psi | 8,881 | 9,268 |
| (j) Melt viscosity, | | |
| at 100/s, poise | 4629 | 4581 |
| at 1500/s, poise | 1120 | 1105 |
| (k) Flammability | | |
| at 1/16, sec (Rating) | 4.9 (VI) | 4.1 (VO) |
| at ⅛, sec (Rating) | 1.5 (VO) | 2.0 (VO) |
| (l) Gloss, 45°, | 23 | 55 |

*Control.

The results in Table 4 indicate that by substituting the polystyrene having a rubber particle size distribution of 2.86 for one having a distribution of 3.63, a vast improvement in ductile impact strength (d) and gloss (l) was achieved, as well as a significant improvement in processability (b), while all other important properties for utility as an engineered thermoplastic were maintained.

EXAMPLE 3

A blend composition comprising poly(2,6-dimethyl-1,4-phenylene)ether and the high impact polystyrene of the Procedure above is prepared by extrusion blending at 530° F., and molding at 520° F., cylinder, and 150° F., mold. For comparison purposes, an identical composition, except for substituting an equal weight of the above-mentioned polystyrene of the prior art denoted AH-1897 above, is prepared, molded and tested. The formulations used and the results obtained are set forth in Table 5:

TABLE 5

Composition Comprising Polyphenylene Ether and High Impact Polystyrene

| Example | 3A* | 3 |
|---|---|---|
| Composition (parts by weight) | | |
| Poly(2,6-dimethyl-1,4-phenylene)ether | 40 | 40 |
| Rubber Modified Polystyrene (Example 1) | — | 60 |
| Rubber Particle Size Distribution, Sv/Sn, 2.86 | | |
| Rubber Modified Polystyrene (AH1897) | 60 | — |
| Rubber Particle Size Distribution, Sv/Sn, 3.63 | | |
| Additives for mold release and stabilization | 2.0 | 2.0 |
| Properties | | |
| (a) Heat distortion Temp, °C. @ 266 psi | 231 | 231 |
| (b) Flow Channel, inches | 15.1 | 16.0 |
| (c) Izod impact strength, ft-lbs/in. notch | 4.9 | 5.2 |
| (d) Dynatup Impact, EMax, in-lb | 44 | 320 |
| (e) Tensile yield strength, psi | 6190 | 6509 |
| (f) Tensile ultimate strength, psi | 6352 | 6368 |
| (g) Tensile elongation, % | 70 | 61 |
| (h) Flexural modulus, psi | 321,450 | 315,250 |
| (i) Flexural yield, psi | 8,978 | 9,485 |
| (j) Melt viscosity, | | |
| at 100/s, poise | 7953 | 8189 |
| at 1500/s, poise | 1735 | 1978 |
| (k) Gloss, 45°, | 14 | 45 |

*Control.

The results in Table 5 indicate that the use of the polystyrene in accordance with this invention (Sv/Sn, 2.86) led to a vast improvement in ductile impact strength (d) and gloss (k) and a significant improvement in processability (d), while all other important properties were maintained.

EXAMPLE 4

A flame retardant composition comprising poly(2,6-dimethyl-1,4-phenylene)ether and the high impact rubber modified polystyrene (prepared by the above-mentioned Procedure) is prepared by extrusion blending, molding and testing by the procedures set forth under Example 2. For comparison purposes, an identical composition, except for substituting an equal weight of the above-mentioned polystyrene denoted AH1897 above, is prepared, molded and tested. The formulations used and the results obtained are set forth in Table 6:

TABLE 6

Compositions Comprising Polyphenylene Ether and High Impact Polystyrene

| Example | 4A* | 4 |
|---|---|---|
| Composition (parts by weight) | | |
| Poly(2,6-dimethyl-1,4-phenylene)ether | 55 | 55 |
| Rubber Modified Polystyrene (Example 1) | — | 45 |
| Rubber Particle Size Distribution, Sv/Sn, 2.86 | | |
| Rubber Modified Polystyrene (AH1897) | 45 | — |
| Rubber Particle Size Distribution, Sv/Sn, 3.63 | | |
| Additives for mold release, stabilization and flame retardancy | 22 | 22 |
| Properties | | |
| (a) Heat distortion Temp, °C. @ 266 psi | 169 | 171 |
| (b) Flow Channel, inches | 18.3 | 18.9 |
| (c) Izod impact strength, ft-lbs/in. notch | 3.6 | 4.5 |
| (d) Dynatup Impact, EMax, in-lb | 28 | 155 |
| (e) Tensile yield strength, psi | 6233 | 6525 |
| (f) Tensile ultimate strength, psi | 5147 | 5157 |
| (g) Tensile elongation, % | 35 | 38 |
| (h) Flexural modulus, psi | 325,306 | 318,243 |
| (i) Flexural yield, psi | 8,775 | 9,116 |
| (j) Melt viscosity, | | |
| at 100/s, poise | 4,983 | 4,824 |
| at 1500/s, poise | 1036 | 981 |

TABLE 6-continued

| Compositions Comprising Polyphenylene Ether and High Impact Polystyrene | | |
|---|---|---|
| Example | 4A* | 4 |
| (k) Flammability | | |
| at 1/16, sec (Rating) | 1.9 VO | 2.0 VO |
| at ⅛, sec (Rating) | 1.2 VO | 1.3 VO |
| (l) Gloss, 45°, | 29 | 55 |

*Control.

The results in Table 6 indicate that the use of the polystyrene in accordance with this invention (Sv/Sn, 2.86) led to vast improvement in ductile impact strength (d) and gloss (l) and a significant improvement in Izod impact strength (c), while all other important properties were maintained.

EXAMPLE 5

A composition comprising poly(2,6-dimethyl-1,4-phenylene)ether and the high impact rubber modified polystyrene (prepared by the above-mentioned Procedure) is prepared by extrusion blending, molding and testing by the procedures set forth under Example 2. For comparison purposes, an identical composition, except for substituting an equal weight of the above-mentioned polystyrene denoted AH-1897 above, is prepared, molded and tested. The formulations used and the results obtained are set forth in Table 7:

TABLE 7

| Compositions Comprising Polyphenylene Ether and High Impact Polystyrene | | |
|---|---|---|
| Example | 5A* | 5 |
| Composition (parts by weight) | | |
| Poly(2,6-dimethyl-1,4-phenylene)ether | 44 | 44 |
| Rubber Modified Polystyrene (Example 1) | — | 56 |
| Rubber Particle Size Distribution, Sv/Sn, 2.86 | | |
| Rubber Modified Polystyrene (AH1897) | 56 | — |
| Rubber Particle Size Distribution, Sv/Sn, 3.63 | | |
| Other Additives for mold release and stabilization | 14 | 14 |
| Properties | | |
| (a) Heat distortion Temp, °C. @ 266 psi | 230 | 228 |
| (b) Flow Channel, inches | 15.2 | 16.2 |
| (c) Izod impact strength, ft-lbs/in. notch | 7.6 | 7.2 |
| (d) Dynatup Impact, EMax, in-lb | 299 | 302 |
| (e) Tensile yield strength, psi | 5602 | 5586 |
| (f) Tensile ultimate strength, psi | 5697 | 5651 |
| (g) Tensile elongation, % | 79 | 89 |
| (h) Flexural modulus, psi | 285,178 | 279,456 |
| (i) Flexural yield, psi | 8,198 | 8,205 |
| (j) Melt viscosity, | | |
| at 100/s, poise | 17,565 | 18,574 |
| at 1500/s, poise | 2,848 | 3,010 |
| (k) Gloss, 45°, | 31 | 41 |

*Control.

The results in Table 7 indicate that the use of the polystyrene in accordance with this invention (Sv/Sn, 2.86) led to significant improvement in mold flow (b) and a marked improvement in surface gloss (l).

EXAMPLE 6

A flame retardant composition comprising (poly(2,6-dimethyl-1,4-phenylene)ether and the high impact rubber modified polystyrene (prepared by the above-mentioned Procedure) is prepared by extrusion blending, molding and testing by the procedures set forth under Example 2. For comparison purposes, an identical composition, except for substituting an equal weight of the above-mentioned polystyrene denoted AH-1897 above, is prepared, molded and tested. The formulations used and the results obtained are set forth in Table 8:

TABLE 8

| Compositions Comprising Polyphenylene Ether and High Impact Polystyrene | | |
|---|---|---|
| Example | 6A* | 6 |
| Composition (parts by weight) | | |
| Poly(2,6-dimethyl-1,4-phenylene)ether | 45 | 45 |
| Rubber Modified Polystyrene (Example 1) | — | 55 |
| Rubber Particle Size Distribution, Sv/Sn, 2.86 | | |
| Rubber Modified Polystyrene (AH1897) | 55 | — |
| Rubber Particle Size Distribution, Sv/Sn, 3.63 | | |
| Other Additives for mold release, stabilization and flame retardancy | 16.5 | 16.5 |
| Properties | | |
| (a) Heat distortion Temp, °C. @ 266 psi | 177 | 171 |
| (b) Flow Channel, inches | 17.4 | 18.4 |
| (c) Izod impact strength, ft-lbs/in. notch | 4.2 | 4.5 |
| (d) Dynatup Impact, EMax, in-lb | 14 | 113 |
| (e) Tensile yield strength, psi | 6087 | 6181 |
| (f) Tensile ultimate strength, psi | 5674 | 5411 |
| (g) Tensile elongation, % | 51 | 52 |
| (h) Flexural modulus, psi | 332,930 | 325,121 |
| (i) Flexural yield, psi | 8,678 | 8,734 |
| (j) Melt viscosity, | | |
| at 100/s, poise | 6,003 | 4,998 |
| at 1500/s, poise | 1,131 | 1,011 |
| (k) Flammability | | |
| at 1/16, sec (Rating) | 4.6 VI | 3.0 VI |
| at ⅛, sec (Rating) | 3.5 VO | 2.7 VO |
| (l) Gloss, 45°, | 23 | 53 |

*Control.

The results in Table 8 indicate that the use of the polystyrene in accordance with this invention (Sv/Sn, 2.86) led to vast improvements in ductile impact strength (d) end gloss (l) and significant improvement in mold flow (b), the other important properties being retained.

EXAMPLE 7

A composition comprising poly(2,6-dimethyl-1,4-phenylene)ether and the high impact rubber modified polystyrene (prepared by the above-mentioned Procedure) is prepared by extrusion blending, molding and testing by the procedures set forth under Example 2. For comparison purposes, an identical composition, except for substituting an equal weight of the above-mentioned polystyrene denoted AH-1897 above, is prepared, molded and tested. The formulations used and the results obtained are set forth in Table 9:

TABLE 9

| Compositions Comprising Polyphenylene Ether and High Impact Polystyrene | | |
|---|---|---|
| Example | 7A* | 7 |
| Composition (parts by weight) | | |
| Poly(2,6-dimethyl-1,4-phenylene)ether | 59 | 59 |
| Rubber Modified Polystyrene (Example 1) | — | 41 |
| Rubber Particle Size Distribution, Sv/Sn, 2.86 | | |
| Rubber Modified Polystyrene (AH1897) | 41 | — |
| Rubber Particle Size Distribution, Sv/Sn, 3.63 | | |
| Other Additives for mold release, stabilization and flame retardancy | 6.5 | 6.5 |
| Properties | | |
| (a) Heat distortion Temp, °C. @ 266 psi | 235 | 241 |
| (b) Flow Channel, inches | 16.0 | 16.4 |
| (c) Izod impact strength, ft-lbs/in. notch | 3.5 | 4.1 |
| (d) Dynatup Impact, EMax, in-lb | 164 | 173 |

TABLE 9-continued

Compositions Comprising Polyphenylene Ether and High Impact Polystyrene

| Example | 7A* | 7 |
|---|---|---|
| (e) Tensile yield strength, psi | 8000 | 7909 |
| (f) Tensile ultimate strength, psi | 7338 | 7323 |
| (g) Tensile elongation, % | 34 | 37 |
| (h) Flexural modulus, psi | 360,905 | 345,179 |
| (i) Flexural yield, psi | 11,684 | 11,769 |
| (j) Melt viscosity, | | |
| at 100/s, poise | 15,038 | 14,514 |
| at 1500/s, poise | 2,920 | 2,836 |
| (k) Flammability | | |
| at 1/16, sec (Rating) | Fail | Fail |
| at ⅛, sec (Rating) | 6.4 VI | 6.1 VI |
| (l) Gloss, 45°, | 27 | 57 |

*Control

The results in Table 9 indicte that the use of the polystyrene in accordance with this invention led to a significant improvment in Izod impact strength (c) and a vast improvment in surface gloss (l), all other important properties being retained.

EXAMPLE 8

A flame retardant composition comprising poly(2,6-dimethyl-1,4-phenylene)ether and the high impact rubber modified polystyrene (prepared by the above-mentioned Procedure) is prepared by extrusion blending, molding and testing by the procedures set forth under Example 2. For comparison purposes, an identical composition, except for substituting an equal weight of the above-mentioned polystyrene denoted AH-1897 above, is prepared, molded and tested. The formulations used and the results obtained are set forth in Table 10:

TABLE 10

Compositions Comprising Polyphenylene Ether and High Impact Polystyrene

| Example | 8A* | 8 |
|---|---|---|
| Composition (parts by weight) | | |
| Poly(2,6-dimethyl-1,4-phenylene)ether, i.v. 0.40 | 53.5 | 53.5 |
| Rubber Modified Polystyrene (Example 1) Rubber Particle Size Distribution, Sv/Sn, 2.86 | — | 46.5 |
| Rubber Modified Polystyrene (AH1897) Rubber Particle Size Distribution, Sv/Sn, 3.63 | 46.5 | — |
| Flame Retardant Additives | | |
| Brominated Polystyrene[a] | 6.5 | 6.5 |
| Antimony Oxide | 2.2 | 2.2 |
| Impact Modifier Styrene-ethylene-butylene-styrene block co-polymer[b] | 5 | 5 |
| Plasticizer | | |
| Bisphenol A | 1.0 | 1.0 |
| ADMEX 433B[c] | 9.0 | 9.0 |
| HS-1[d] | 1.0 | 1.0 |
| Polyethylene | 1.5 | 1.5 |
| Zinc Oxide | 0.15 | 0.15 |
| Zinc sulfide | 0.15 | 0.15 |
| Properties | | |
| (a) Heat distortion Temp, °C. @ 266 psi | 208 | 208 |
| (b) Flow Channel, inches | 18.9 | 19.9 |
| (c) Izod impact strength, ft-lbs/in. notch | 6.4 | 6.3 |
| (d) Dynatup Impact, EMax-L, in-lb | 175 | 231 |
| (e) Tensile yield strength, psi | 6864 | 7131 |
| (f) Tensile ultimate strength, psi | 6265 | 6156 |
| (g) Tensile elongation, % | 42 | 49 |
| (h) Flexural modulus, psi | 333,012 | 327,214 |
| (i) Flexural yield, psi | 10,058 | 10,319 |
| (j) Melt viscosity, | | |
| at 100/s, poise | 6,370 | 5,815 |
| at 1500/s, poise | 1,293 | 1,207 |

TABLE 10-continued

Compositions Comprising Polyphenylene Ether and High Impact Polystyrene

| Example | 8A* | 8 |
|---|---|---|
| (k) Gloss, 45°, | 24 | 36 |

*Control
[a] PC 68 PB from Great Lakes Chemical
[b] Shell Chemical Co. KD 1101
[c] ADMEX 433B - oligomeric polyester from Nuodex Inc.
[d] HS-1 - aliphatic sodium sulfonate from American Hoechst Company The results set forth in Table 10 indicate that the use of the polystyrene in accordance with the invention leads to a substantial improvement in ductile impact (d) and in surface gloss (l) and a significant improvement in mold flow (b) as well as retention of all of the other important properties.

For purposes of further comparison, a rubber modified high impact polystyrene of the core shell type as described in Bennett and Lee, Jr., U.S. Pat. No. 4,513,120, and available from Mobile Chemicals under product designation Mobil 7800A is subjected to particle size measurements and the data obtained are set forth in Table 11:

TABLE 11

Rubber Modified Polystyrene of the Core Shell Type

| | Comparative Example B* |
|---|---|
| Rubber Content (%) | 9.2 |
| Rubber number average particle size (Sn) microns | 0.2 |
| Rubber volume average particle size (Sv) microns | 0.65 |
| rubber particle size distribution (sv/Sn) | 3.25 |
| Composition number average molecular weight average (Mn) | 62,000 |
| Weight average molecular weight (Mw) | 205,000 |
| Molecular weight Distribution (Mw/Mn) | 3.3 |
| Swell Index | 12 |
| Gel Content (%) | 28.5 |

The novel high impact polystyrene of this invention (Example 1) is molded at a melt temperature of 430° F. and a mold temperature of 140° F., and tested by standard procedures. No polyphenylene ether resin is included. For comparison purposes the known rubber modified polystyrene of Comparative Example B* is also molded and tested. The properties obtained are set forth in Table 12:

TABLE 12

High Impact Rubber Modified Polystyrenes

| Example | 1 | Comp. 1B* |
|---|---|---|
| Parts by weight | | |
| Rubber Modified Polystyrene Particle Size Distribution, Sv/Sn, 2.86 | 100 | — |
| Rubber Modified Polystyrene (According to U.S. 4,513,120) (Mobil 7800A) core-shell Particle Size Distribution, Sv/Sn, 3.25 | — | 100 |
| Properties | | |
| Heat distortion temp., °F. @ 266 psi | 168 | 167 |
| Channel Flow, inches | 28.7 | 25.2 |
| Izod impact strength, ft-lbs/in notch | 3.3 | 2.0 |
| Ductile impact strength, Dynatup, in-lbs | 98 | 23 |
| Tensile yield strength, psi | 4,243 | 4,569 |
| Flexural modulus, psi | 289,284 | 266,735 |
| Gloss, 45° | 55 | 62 |

The results in Table 12 indicate that the polystyrene in accordance with the present invention has significantly improved mold flow and Izod impact strength, and vastly improved ductile impact strength, while retaining the high gloss and other important propeties of the core-shell rubber modified polystyrenes typical of those in U.S. Pat. No. 4,513,120.

Experiments have also shown that when the rubber modified polystyrene of this invention (Procedure above) is substituted for the core shell rubber modified high gloss polystyrene of Comparative Example B* in compositions containing poly(2,6-dimethyl-1,4-phenylene)ether, better flows are obtained and higher impact strengths while the high gloss is retained together with all other important properties.

Experiments have also shown that the polystyrene of this invention can improve the gloss of polyphenylene ether compositions to the level provided by acrylonitrile-butadienestyrene (ABS) systems in a very economical fashion. A comparison is set forth in Table 13:

TABLE 13

Gloss Comparison of Acrylonitrile-Butadiene-Styrene and Polyphenylene Ether-Polystyrene

| Example | Color | 45° Gloss | 60° Gloss |
|---|---|---|---|
| 9A* ABS Cycolac ® T[a] | black | 56 | 94 |
| 9B* ABS Cyclolac ® KJW[b] (FR, UL 94 VO) | beige | 54 | 87 |
| 2 NORYL ® N190[c] (FR, UL 94 VO) | black | 57 | 93 |
| 3 NORYL ® PXO844[d] (solution alloyed) | natural beige | 55 | 91 |

*Control
[a]Borg Warner Co.
[b]Borg Warner Co.
[c]General Electric Co.
[d]General Electric Co.

The data in Table 13 demonstrate the effectiveness of the rubber modified polystyrene of this invention to provide compositions with polyphenylene ethers having a very high degree of surface appearance.

The above-mentioned patents and publications are incorporated herein by reference.

Many variations will suggest themselves to those skilled in this art in light of the above, detailed description. For example, instead of poly(2,6-dimethyl-1,4-phenylene)ether, poly(2,6-dimethyl-co-2,3,6-trimethyl-1,4-phenylene)ether containing 5 mole% of 2,3,6-trimethyl units can be substituted. The styrene can be substituted partially or completely with alpha-methyl styrene or vinyl toluene. The butadiene rubber can be substituted with a rubbery styrene-butadiene copolymer, an isoprene polymer or an ethylene/propylene elastomer. All such obvious variations are within the full intended scope of the appended claims.

We claim:

1. A thermoplastic composition comprising:
   (a) a polyphenylene ether resin; and
   (b) a rubber modified polystyrene containing dispersed rubbery particles having a maximum mean diameter of about 2.0 microns and a ratio of the volume average particle size/number average particle size of 2.00 to about 3.20.

2. The thermoplastic composition of claim 1 wherein the ratio of the volume average particle size/number average particle size is about 2.75 to about 3.00.

3. The thermoplastic composition of claim 1 wherein the volume average particle size of the rubber particles is up to 2.0 microns.

4. The thermoplastic composition of claim 1 wherein the rubber modified polystyrene has a ratio of weight average molecular weight/number average molecular weight of at least about 2.5.

5. The thermoplastic composition of claim 1 wherein the composition has a swell index of less than about 11.0.

6. The thermoplastic composition of claim 1 wherein the composition has a gel concentration of greater than about 19%.

7. The thermoplastic composition of claim 1, wherein polyphenylene ether resin (a) is a homopolymer or copolymer containing structural units of the formula

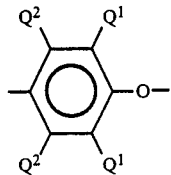

in which for each of these units independently each $Q^1$ is hydrogen, halogen, primary or secondary lower alkyl having up to seven carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

8. The thermoplastic composition of claim 1, wherein polyphenylene ether resin is poly(2,6-dimethyl-1,4-phenylene ether).

9. The thermoplastic composition of claim 8, wherein the poly(2,6-dimethyl-1,4-phenylene ether) has an intrinsic viscosity of from about 0.4 to about 0.5 deciliters per gram in chloroform at 25° C.

10. The thermoplastic composition of claim 1, wherein polyphenylene ether resin (a) is poly(2,6-dimethyl-co-2,3,6-trimethyl-1,4-phenylene ether).

11. The thermoplstic composition of claim 1 wherein the polyphenylene ether resin is present in an amount of from about 10 to about 90% by weight based on the overall weight of the composition.

12. The thermoplastic composition of claim 11 wherein the polyphenylene ether resin is present in an amount of from about 20 to 80% by weight based on the overall weight of the composition.

13. The thermoplastic composition of claim 12 wherein the polyphenylene ether resin is present in an amount of from about 50 to about 80 parts and the polystyrene is present in an amount of 20 to about 50.

14. The thermoplastic composition of claim 1 wherein the rubber of the rubber modified polystyrene is polybutadiene.

15. The thermoplastic composition of claim 1 wherein the styrene resin has at least 25% by weight of polymer units derived from a compound having the formula

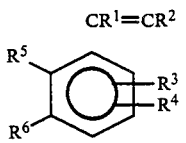

wherein $R^1$ and $R^2$ are selected from lower alkyl or alkenyl groups having 1 to 6 carbon atoms and hydrogen; and $R^3$, $R^4$, $R^5$ and $R^6$ are selected from chloro, bromo, hydrogen and lower alkyl or alkenyl groups having from 1 to 6 carbon atoms.

16. The thermoplastic composition of claim 1 further comprising a flame retardant effective amount of a flame retardant agent.

17. The thermoplastic compositions of claim 16 wherein the flame retardant agent comprises an aromatic phosphate, a halogenated vinyl aromatic polymer, a halogenated polycarbonate or a mixture of any of the foregoing.

18. The thermoplastic composition of claim 1 wherein component (b) has a number molecular weight of about 61,000, a weight average molecular weight of about 195,000, a number average rubber particle size of about 0.60, a volume average rubber particle size of about 1.60, a swell index of about 9.9 and a gel content of about 21.3%.

19. A shaped article produced from the composition of claim 1.

20. A thermoplastic composition of claim 12 wherein the polyphenylene ether is present in an amount of from about 40% to about 59% by weight based upon the overall weight of the composition.

21. A thermoplastic composition of claim 2 wherein the ratio of the volume average particle size/number average particle size is about 2.86.

* * * * *